(12) United States Patent
Muntz et al.

(10) Patent No.: US 7,039,073 B1
(45) Date of Patent: May 2, 2006

(54) BOUND MODE TECHNIQUE FOR ACCOMMODATING HIGH-BANDWIDTH DATA FLOW WITHIN AN INTERMEDIATE NETWORK NODE

(75) Inventors: Gary S. Muntz, Lexington, MA (US); Guy C. Fedorkow, Bedford, MA (US)

(73) Assignee: Cisco Technology, Inc., San Jose, CA (US)

(*) Notice: Subject to any disclaimer, the term of this patent is extended or adjusted under 35 U.S.C. 154(b) by 842 days.

(21) Appl. No.: 09/790,826

(22) Filed: Feb. 22, 2001

(51) Int. Cl.
*H04J 3/02* (2006.01)

(52) U.S. Cl. .................. 370/539; 370/540; 370/537

(58) Field of Classification Search ............... 370/400, 370/402, 404, 463, 464, 465, 468, 406, 403
See application file for complete search history.

(56) References Cited

U.S. PATENT DOCUMENTS

| | | | |
|---|---|---|---|
| 5,740,171 A | 4/1998 | Mazzola et al. | |
| 5,751,710 A | 5/1998 | Crowther et al. | |
| 5,796,732 A | 8/1998 | Mazzola et al. | |
| 5,884,043 A | 3/1999 | Teplitsky | |
| 5,991,817 A | 11/1999 | Rowett et al. | |
| 5,995,376 A * | 11/1999 | Schultz et al. | 361/788 |
| 6,054,942 A | 4/2000 | Stemmler | |
| 6,081,530 A * | 6/2000 | Wiher et al. | 370/395.53 |
| 6,163,543 A | 12/2000 | Chin et al. | |
| 6,167,062 A * | 12/2000 | Hershey et al. | 370/503 |
| 6,292,491 B1 | 9/2001 | Sharper | |
| 6,309,237 B1 * | 10/2001 | Longueville | 439/267 |
| 6,351,786 B1 * | 2/2002 | Elmore et al. | 710/303 |

(Continued)

OTHER PUBLICATIONS

U.S. Appl. No. 09/791,062, G. Muntz.
U.S. Appl. No. 09/790,970, G. Federkow et al.
U.S. Appl. No. 09/791,070, G. Federkow et al.

(Continued)

*Primary Examiner*—Ajit Patel
*Assistant Examiner*—Andrew C. Lee
(74) *Attorney, Agent, or Firm*—Cesari and McKenna, LLP

(57) ABSTRACT

A bound mode mechanism and technique efficiently accommodates high-bandwidth data traffic flow within an intermediate node of a computer network. The bound mode mechanism combines two half-slot line card connectors of a backplane in an aggregation router into a single full-slot line card arrangement to thereby increase the bandwidth provided to a high-speed, full-height line card of the router. The technique is also capable of accommodating generic half-slot (i.e., subslot) connectors, each of which is capable of supporting a variety of data formats. The bound mode mechanism further allows use of a high-speed trunk card without the penalty of supporting high trunk level bandwidth on all of the slot connectors of the router. The mechanism enables use of a simple backplane, while also maintaining a low pin count on a backplane logic circuit of the router.

50 Claims, 10 Drawing Sheets

U.S. PATENT DOCUMENTS

| | | | |
|---|---|---|---|
| 6,529,569 B1 * | 3/2003 | Corp et al. | 375/353 |
| 6,597,689 B1 * | 7/2003 | Chiu et al. | 370/354 |
| 6,611,853 B1 * | 8/2003 | Graafmans | 708/108 |
| 6,662,254 B1 * | 12/2003 | Tal et al. | 710/300 |
| 6,675,254 B1 * | 1/2004 | Wachel | 710/316 |
| 6,741,615 B1 * | 5/2004 | Patwardhan et al. | 370/514 |
| 6,836,811 B1 * | 12/2004 | Ho et al. | 710/301 |
| 6,868,217 B1 * | 3/2005 | Moulton et al. | 385/135 |

OTHER PUBLICATIONS

Cisco Systems, Inc.; White Paper: Alternatives for High Bandwidth Connections Using Parallel T1/E1 Links; pp. 1-8.

U.S. Appl. No. 09/791,063, filed Feb. 22, 2001, Rachepalli et al.

* cited by examiner

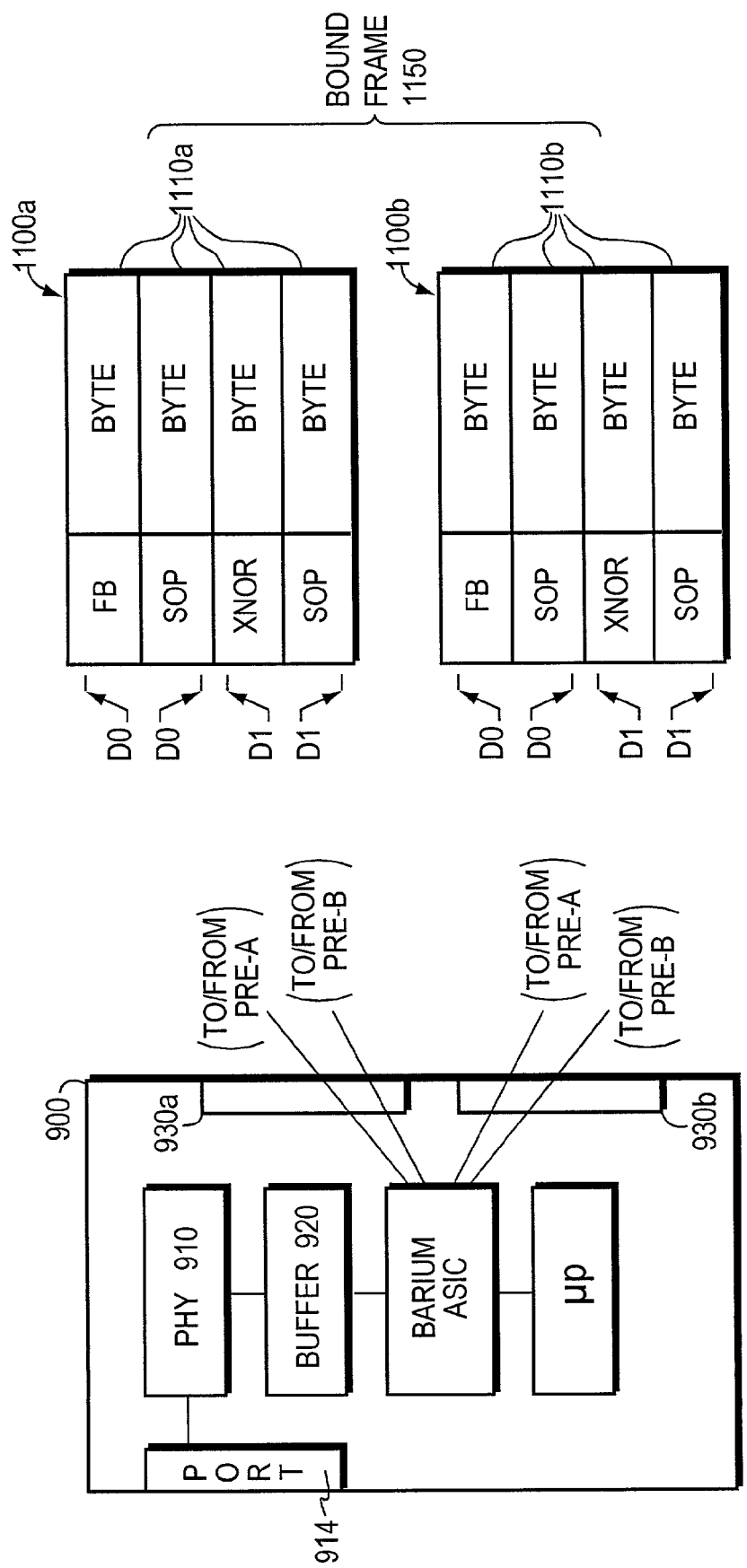

BOUND MODE TECHNIQUE FOR ACCOMMODATING HIGH-BANDWIDTH DATA FLOW WITHIN AN INTERMEDIATE NETWORK NODE

CROSS-REFERENCE TO RELATED APPLICATIONS

The present invention is related to the following co-pending and commonly assigned U.S. patent applications:

U.S. patent application Ser. No. 09/791,062 filed on Feb. 22, 2001 now issued as U.S. Pat. No. 6,973,072 on Dec. 6, 2005 titled, High Performance Protocol for an Interconnect System of an Intermediate Network Node;

U.S. patent application Ser. No. 09/790,970 filed on Feb. 22, 2001 titled, Apparatus and Technique for Conveying Per-Channel Flow Control Information to a Forwarding Engine of an Intermediate Network Node; and U.S. patent application Ser. No. 09/791,070 filed on Feb. 22, 2001 titled, Mechanism and Technique for Detecting and Containing a Clock Glitch within a Clocking Subsystem of an Intermediate Network Node, each of which was filed on even date herewith and incorporated by reference as though fully set forth herein.

FIELD OF THE INVENTION

The present invention relates to intermediate nodes of communications networks and, in particular, to a mechanism and technique for efficiently accommodating high-bandwidth data flow within an intermediate device used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node or device, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISPs equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one trunk interface. These interfaces may be embodied as ports contained on line cards of the aggregator. Thus, the aggregator essentially functions as a large "fan-in" device wherein a plurality (e.g., thousands) of relatively low-speed subscriber input links is aggregated onto a single, high-speed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are preferably 28 T1s to each T3 connection; a T3 connection thus has an effective data rate of approximately 42 Mbps. On the other hand, the effective data rate of an OC-12 trunk interface connection is typically 622 Mbps. As noted, the aggregator receives a plurality of subscriber inputs (e.g., 1000 T1 lines) and aggregates them onto a single output trunk (e.g., an OC-12 link). That is, the aggregation router allows many subscribers to forward their traffic flows "upstream", typically to the Internet. To efficiently perform such aggregation, the total bandwidth supportable by a trunk interface of the aggregator is approximately equal to the total input bandwidth supportable by the input interfaces of the aggregator.

One way to facilitate this aggregation function is to dedicate a connector slot of a backplane on the aggregator for a trunk line card that supports half of the bandwidth of the aggregator. However this approach may be undesirable because of the restrictions it imposes on configuration of the aggregator. For example, the dedicated slot approach makes redundancy difficult, particularly for trunk card redundancy, because it requires reserving two full slots of the router backplane for trunk cards. For applications requiring only a single (non-redundant) trunk card, the remaining full slot dedicated to a trunk card cannot be used for additional customer/subscriber line cards. This approach forces a user of the aggregator to conform to strict configuration rules, which is highly undesirable particularly from a scalability perspective.

Therefore, an objective of the present invention is to provide a mechanism and technique that enables high-bandwidth traffic flows within a backplane of an aggregation router using a variety of different line cards that may be accommodated by slots of the backplane.

SUMMARY OF THE INVENTION

The present invention relates to a bound mode mechanism and technique that efficiently accommodates high-bandwidth data traffic flow within an intermediate node, such as an aggregation router, of a computer network. To that end, the bound mode mechanism combines two half-slot line card connectors of a backplane in the router into a single full-slot line card arrangement to thereby increase the bandwidth provided to a high-speed, full-height line card of the router. The novel technique is also capable of accommodating generic half-slot (i.e., subslot) connectors, each of which is capable of supporting a variety of data formats. The bound mode mechanism further allows use of a high-speed trunk card without the penalty of supporting high trunk level bandwidth on all of the slot connectors of the router. The mechanism enables use of a simple backplane, while also maintaining a low pin count on a backplane logic circuit of the router.

In the illustrative embodiment, bound mode operates synchronously, though there are two distinct timing domain paths crossing the backplane. These timing domains manifest as paths coupled to two subslot connectors of a full slot within the backplane. Both paths operate with their own clocks, as in an unbound case, because of the need to recover data timing with a clock signal traveling with the data. Timing of the two interconnect paths is recombined at a frame clock level to generate a bound frame.

Advantageously, the bound mode technique increases the bandwidth available for a single line card. In addition, the technique provides an efficient scaling feature that supports merging of data traffic flows received at many diverse, relatively low-speed subscriber line cards onto one or more high-speed, trunk interface cards. Thus the aggregation router is capable of supporting relatively fast trunk speeds, while providing a plurality of slots that can accommodate many subscriber/customers. Moreover, each customer may require different data formats for its traffic flows and, accordingly, the novel mechanism provides generic slots adapted to accommodate different line cards that support the various data formats. For example, the line cards may comprise half-slot line cards that support data formats such as DS3, SDH1, OC-3, ATM or even DSL. Each of the subslots of the router backplane is capable of delivering to a trunk card half of that trunk's supportable bandwidth.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 9 is a schematic block diagram of an illustrative example of a line card configured to implement a bound mode technique of the present invention;

FIG. 11 is a schematic block diagram illustrating the format of a bound frame in accordance with the present invention.

DETAILED DESCRIPTION OF AN ILLUSTRATIVE EMBODIMENT

Figure 1:
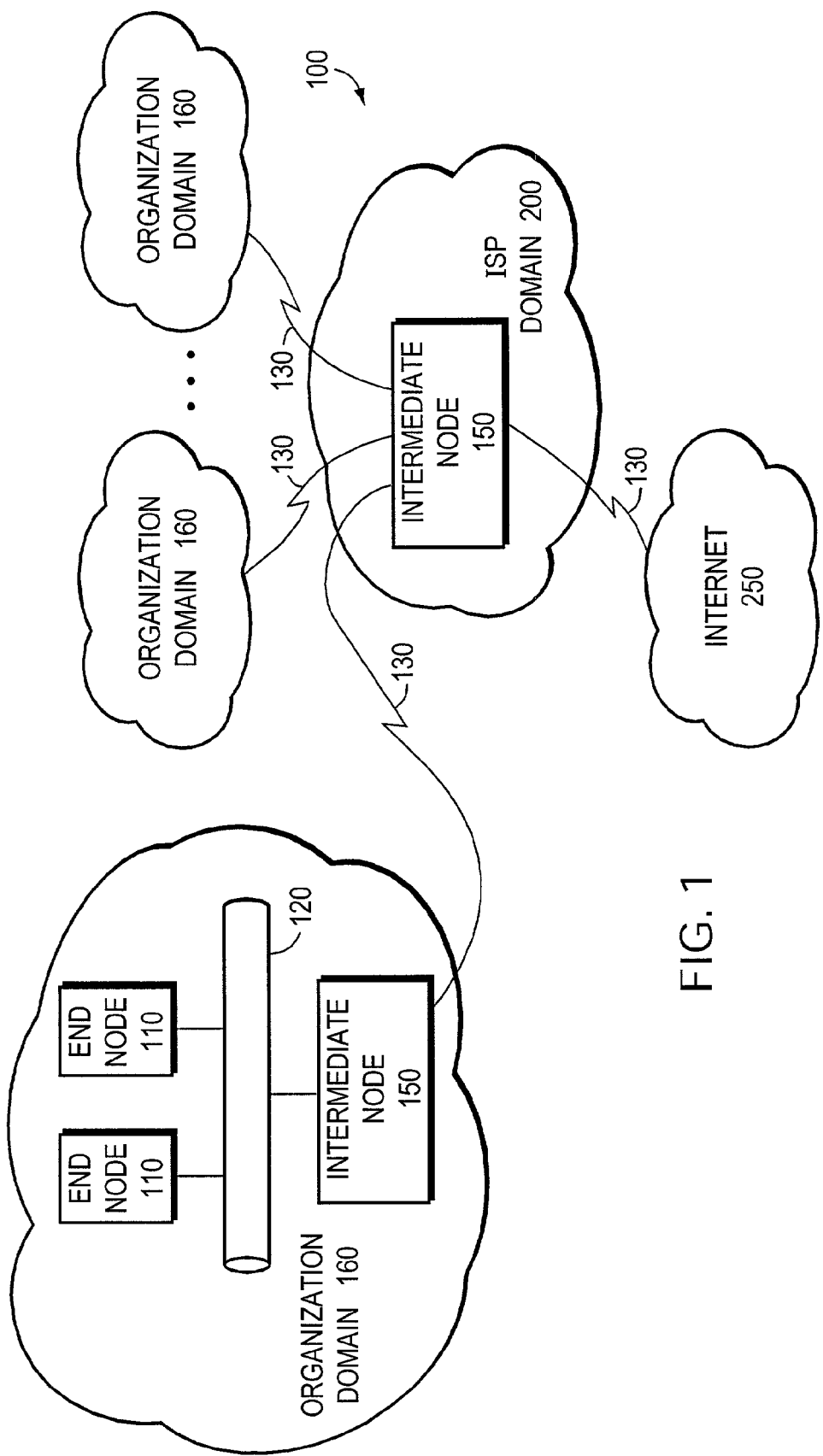
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes or devices 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
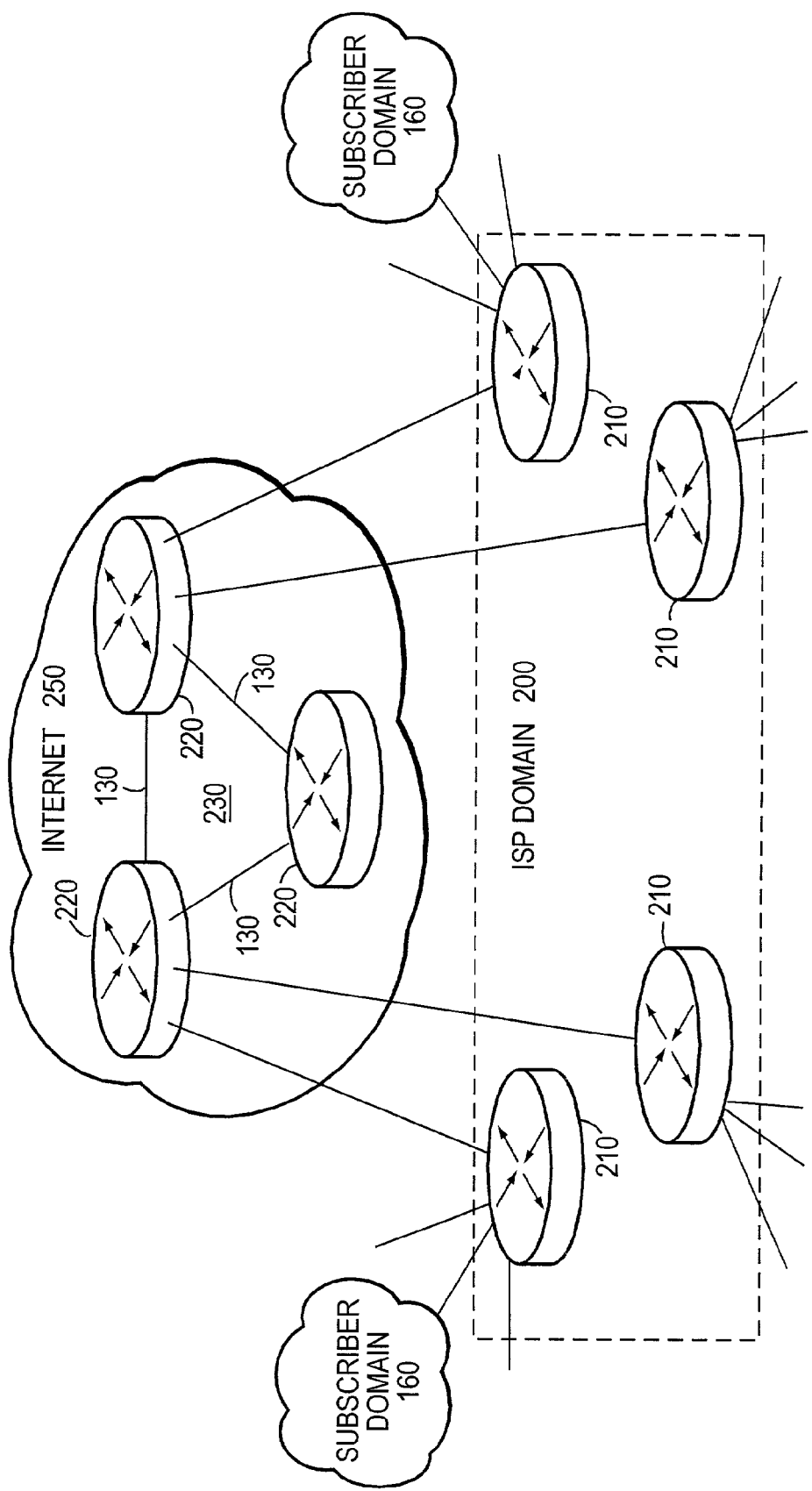
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
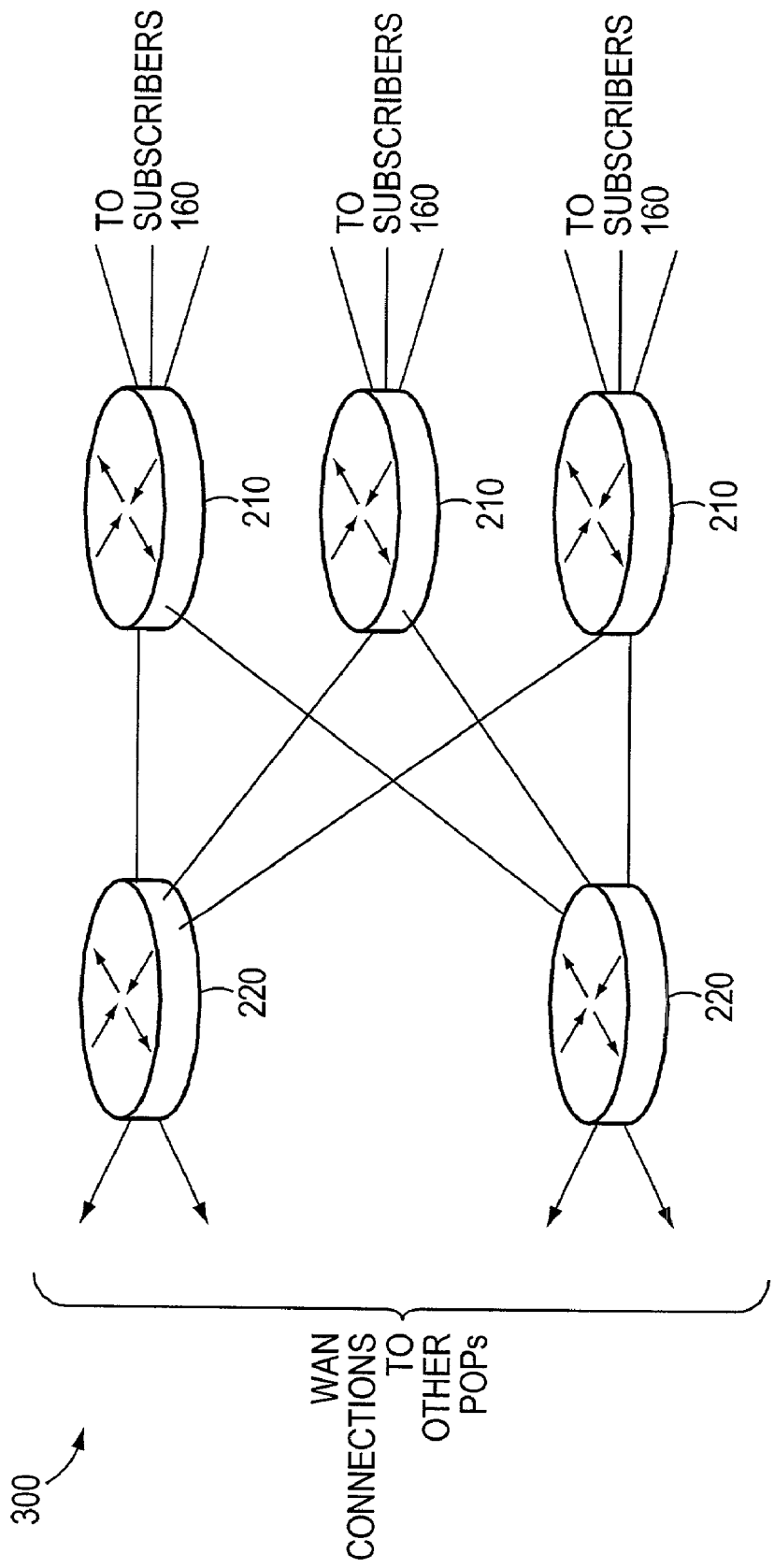
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
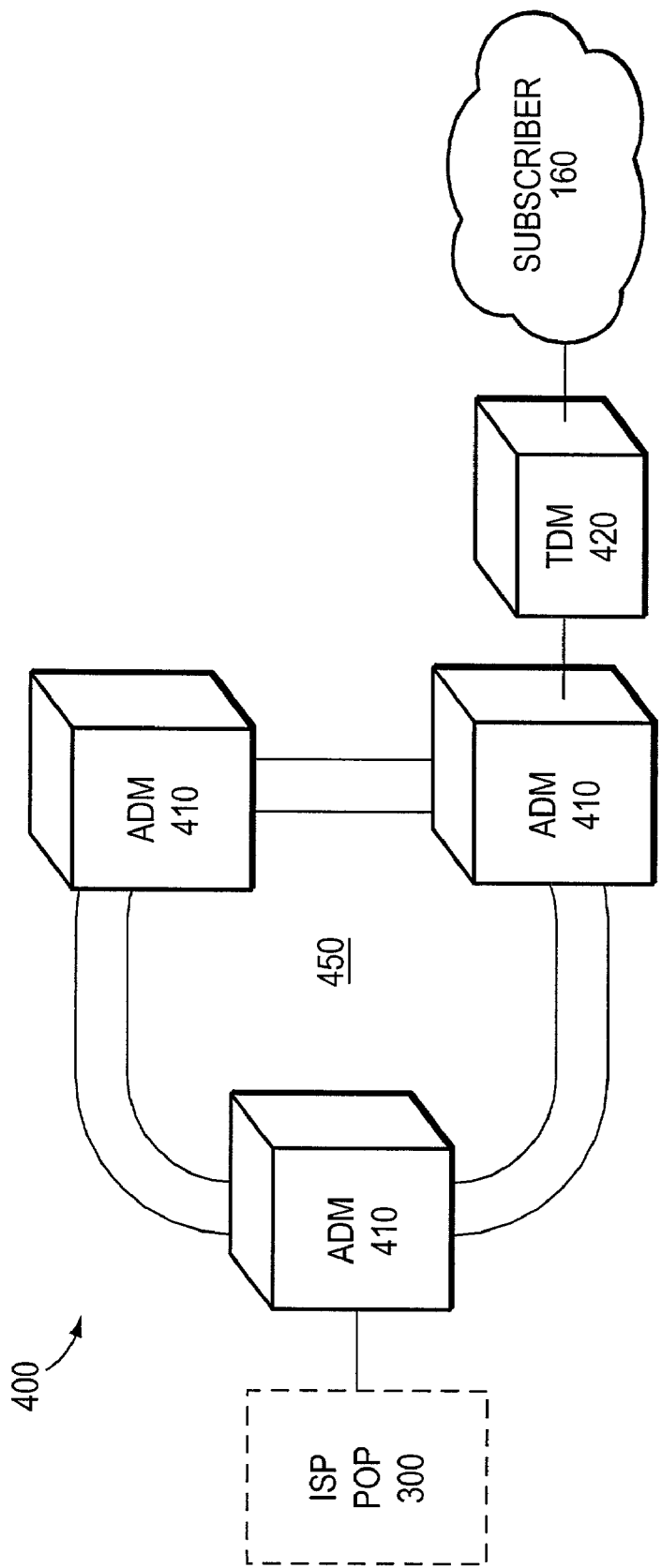
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
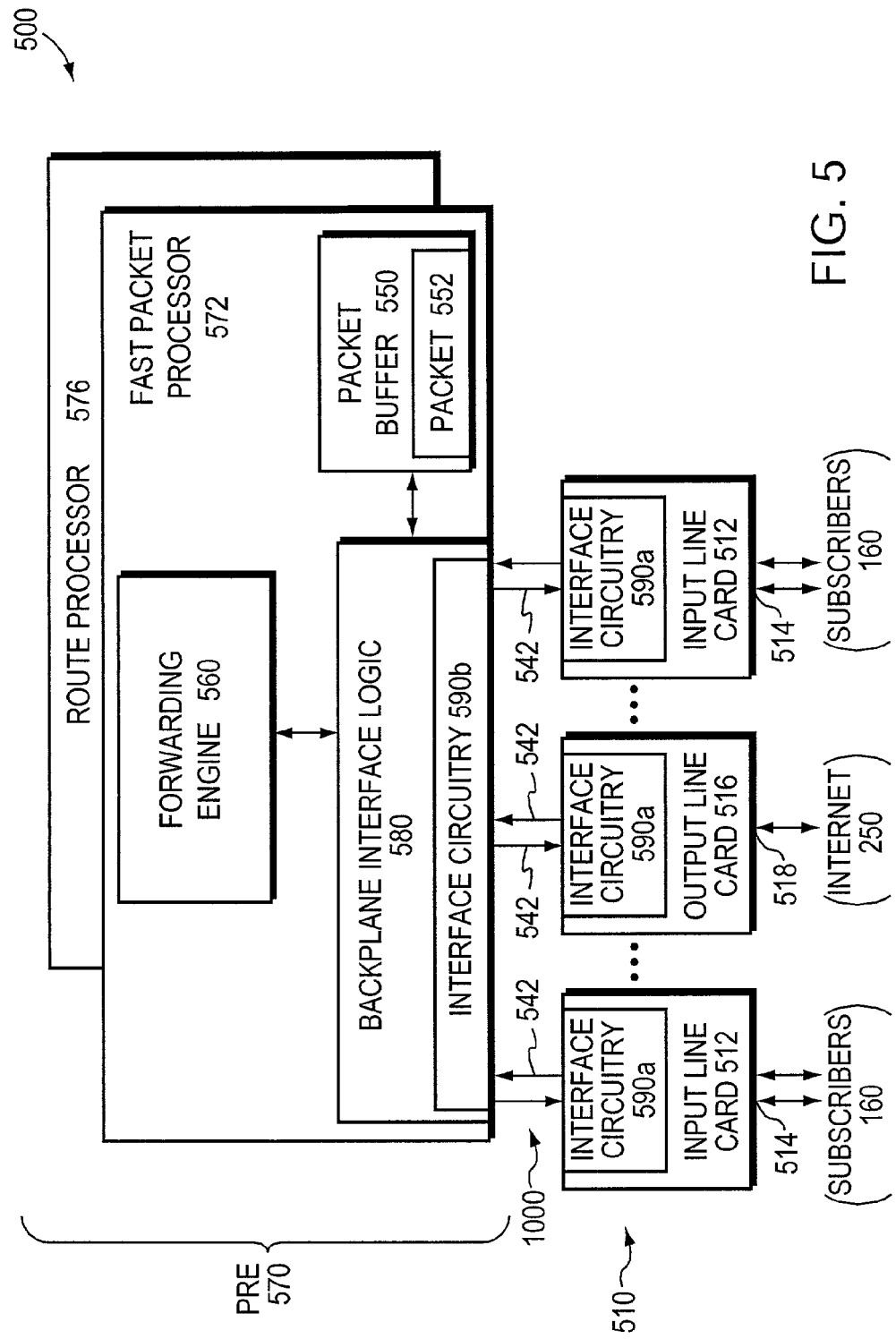
FIG. 5 is a schematic block diagram of an aggregation router having a backplane adapted to receive a plurality of line cards in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 1000. The line cards 510 include a plurality of input cards 512 having input ports 514 coupled to subscribers 160 and at least one output "trunk" card 516 configured to aggregate the subscriber inputs over at least one output port 518. The PRE 570 is an assembly comprising a fast packet processor module and a route processor module adapted to perform packet forwarding and routing operations, respectively. The PRE assembly also provides quality of service (QoS) functions for complete packets received from each input line card over the interconnect system. To that end, the interconnect system 1000 comprises a plurality of high-speed unidirectional links 542 coupling the PRE to each line card 510.

The unidirectional links 542 facilitate scaling within the aggregator in terms of speed per line card, while also limiting the number of pins needed to interface to the plurality of line cards. These links are preferably clock forwarded, point-to-point links; in the illustrative embodiment, each unidirectional link is a "narrow" connection comprising two data signals for transporting the data and one clock signal for carrying clocks. However, it will be understood to those skilled in the art that the clock forwarding technique may scale to accommodate other clock forwarding arrangements such as, e.g., a "wide" connection comprising four data signals for each accompanying clock signal.

The aggregator 500 illustratively includes sixteen (16) line cards 510, each of which is configured for an OC-12 (622 Mbps) data rate. Thus, the point-to-point links 542 coupled to the line cards must be capable of supporting such data rates. An interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in and commonly-owned U.S. patent application Ser. No. 09/791,062 filed on Feb. 22, 2001 now issued as U.S. Pat. No. 6,973,072 on Dec. 6, 2005 titled High Performance Protocol for an Interconnect System of an Intermediate Network Node, which application is hereby incorporated by reference as though fully set forth herein.

Interface circuitry 590 coupled to the ends of the unidirectional links 542 is resident on both the line cards 510 and a backplane logic circuit 580 of the PRE 570. The backplane logic circuit 580 is preferably embodied as a high performance, application specific integrated circuit (ASIC), hereinafter referred to as the Cobalt ASIC, which is configured to further interface the line cards to a packet buffer 550 and a forwarding engine 560 of the PRE. The packet buffer 550 is a memory used to store packets 552 as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator. An example of a backplane logic circuit that may be advantageously used with the present invention is disclosed in co-pending and commonly-owned U.S. patent application Ser. No. 09/791,063 filed on Feb. 22, 2001 titled High Performance Interface Logic Architecture of an Intermediate Network Node, which application is hereby incorporated by reference as though fully set forth herein.

The interface circuitry 590 includes interconnect ports coupled to the point-to-point links 542 of the interconnect system 1000 and implements a unidirectional, point-to-point clock forwarding technique that is configured for direct ASIC-to-ASIC transmission over a backplane of the aggregation router. As a result, the interface circuitry 590a resident on the line cards 510 is preferably embodied within a high-performance ASIC, hereinafter referred to as the Barium ASIC, whereas the interface circuitry 590b is resident on the Cobalt ASIC. The interface circuitry generally functions as a translator that converts conventional formats of data received at the line cards 510 to a novel protocol format for transmission from, e.g., the Barium ASIC over the interconnect system 1000 to the Cobalt ASIC. The ASICs also include circuitry to perform cyclic redundancy code (CRC) generation and checking on packets, along with interconnect format checking.

Broadly stated, the backplane of the aggregator supports independent "half-slot" line cards, each capable of delivering up to OC-12 bandwidth using a narrow mode connection (e.g., each of the two data signals per half slot operating at 400 Mb/s). Alternatively, a pair of backplane connectors may be attached to one "full-slot" line card. A full slot card may connect just one of the connectors to its interface circuitry, in which case it is functionally identical to a half-slot card. However, as described further herein, if a full slot line card requires more bandwidth than that available from one half-slot, it may combine ("bind") both of its half-slot interfaces into a single bound interface with twice the bandwidth. Each bound interface preferably supports up to OC-24 bandwidth for a narrow mode connection, or up to OC-48 bandwidth for a bound, wide mode connection.

Figure 6:
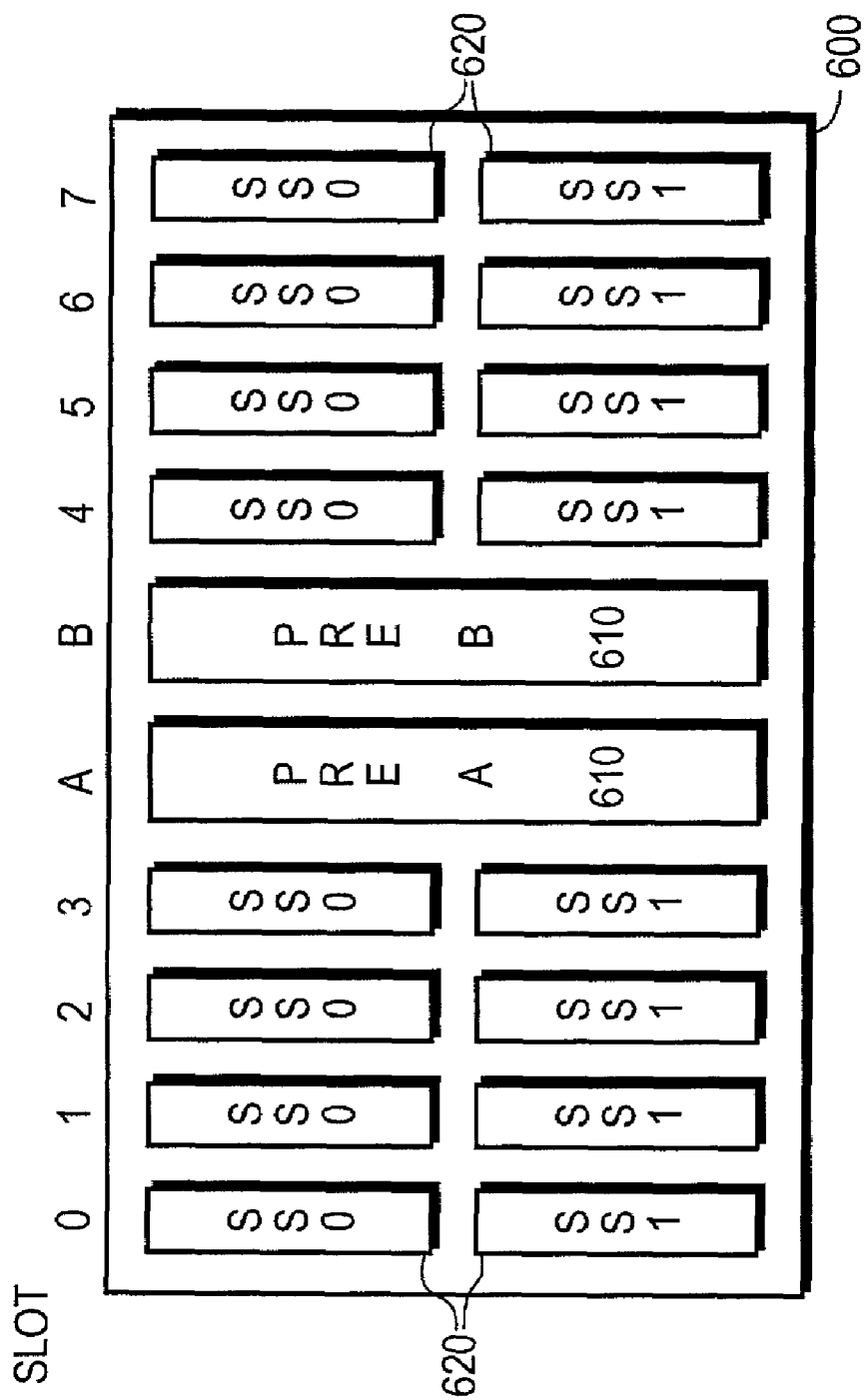
FIG. 6 is a schematic block diagram of an illustrative embodiment of the backplane of the present invention.

FIG. 6 is a schematic block diagram of an illustrative embodiment of the back-plane 600 of the aggregation router 500. The backplane 600 includes two central, full slots 610, each having a connector configured to accommodate (receive) a PRE module assembly. In particular, these central slot connectors are used to accommodate redundant PRE assemblies PRE-A and PRE-B. The backplane is organized such that there are eight (8) adjacent slots (four on each side of the redundant central PRE slots) with each adjacent slot having two (2) subslots (SS0, SS1). Thus, the backplane illustratively comprises sixteen (16) half-slots 620, each of which includes a connector configured to accommodate a half-slot height (i.e., half-height) line card. In addition to supporting half-height line cards, the backplane 600 may support full-slot height (i.e., full-height) line cards that span both subslots of a slot and that may include either one or two connectors adapted for insertion into the connectors of the subslots of the slot.

In the illustrative embodiment, all line cards are full-height line cards for a total of 8 line cards in the aggregation router. However, in an alternate embodiment, the backplane 600 can further support 16 half-height cards or any mixture of full-height and half-height cards. Each half-slot connector 620 of the backplane can support an OC-12 line card, whose bandwidth conforms to a trunk interface card 516 of the aggregator. Notably, the trunk card can be inserted into any of the symmetrical half-slots on the backplane; that is, there is no dedicated slot for the trunk line card 516 in the router platform. Advantageously, the platform can support a variety of subscriber line cards, each having different data bandwidth and formats, such as T1, T3, OC-3 and/or SDH1 (the European equivalent of OC-3).

Figure 7:
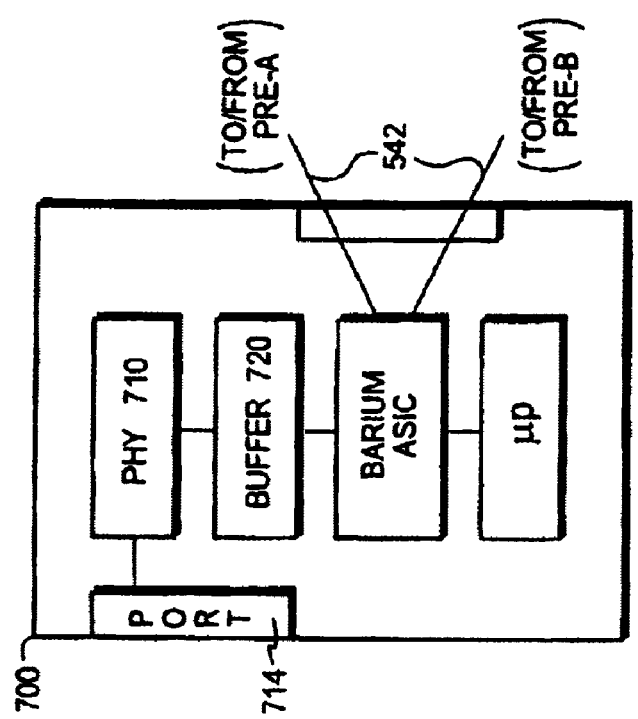
FIG. 7 is a schematic block diagram of an embodiment of a line card that may be advantageously used with the present invention.

FIG. 7 is a schematic block diagram of an embodiment of a half-height (or a full-height) line card that may be advantageously used with the present invention. The card is an OC-12 trunk/subscriber line card 700 comprising the Barium ASIC coupled to respective Cobalt ASICs on PRE-A and PRE-B over links 542. The Barium ASIC includes some buffering but, as noted, is generally a translator that converts conventional data bus "streaming" (TTL) and/or peripheral computer interconnect (PCI) input data formats to interconnect protocol format for transmission over the interconnect system to the Cobalt ASIC. For example, streaming data is received from a data bus interface port 714 and forwarded to a conventional physical layer (PHY) device 710 of the line card prior to storage in a buffer 720. The data is then forwarded as a streaming interface into the Barium ASIC, where it is converted to interconnect format and forwarded over the point-to-point links 542 to the Cobalt ASICs. Alternatively, the line card 700 may have a PCI interface port for receiving PCI format data from a PCI bus.

Figure 8:
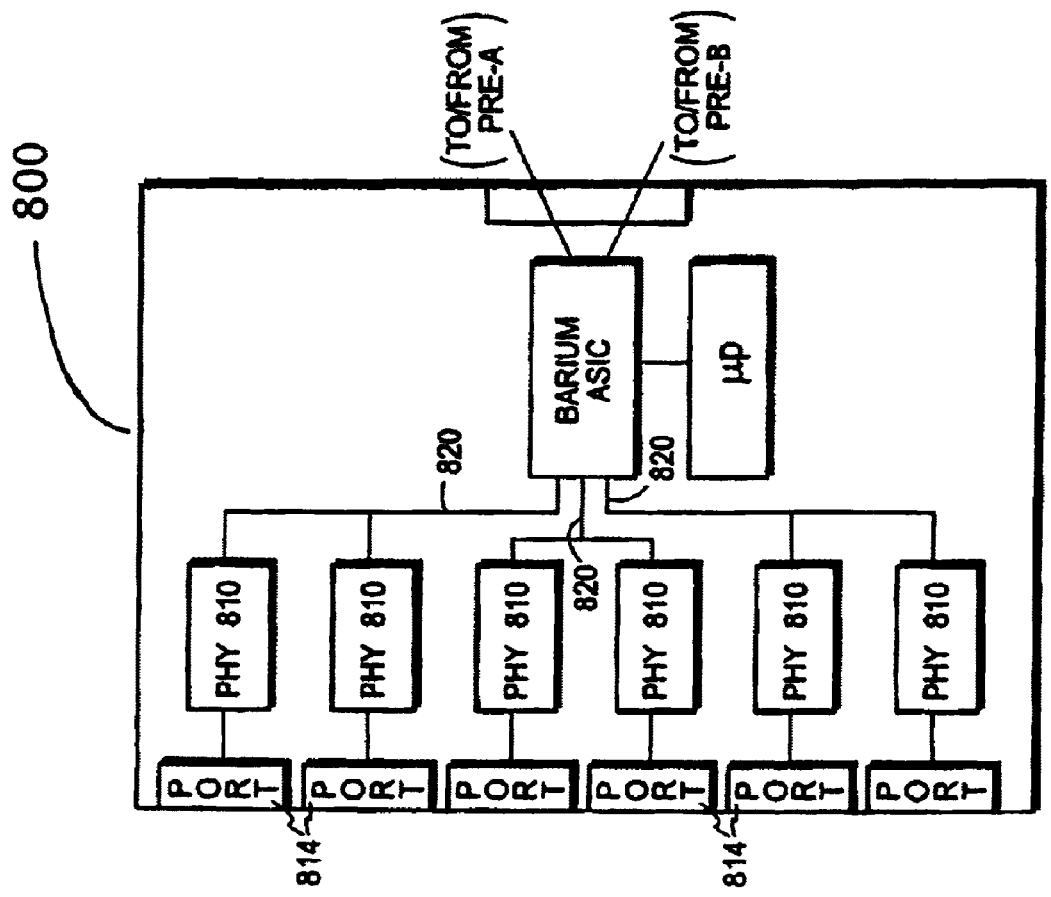
FIG. 8 is a schematic block diagram of another embodiment of a line card that may be advantageously used with the present invention.

FIG. 8 is a schematic block diagram of another embodiment of a line card, e.g., a full-height line card, that may be advantageously used with the present invention. The line card is a DS3 (or T3) line card 800 that preferably includes six (6) DS3 ports 814. A DS3 signal is essentially a conditioned version of a T3 signal having the same data format and data rate characteristics of a T3 signal. Each DS3 port 814 is coupled to a PHY device 810 that conforms to the PCI standard; preferably sets of two PHY chips are coupled a Barium ASIC via PCI buses 820. Thus, the 6 ports on the DS3 line card connect to the Barium ASIC as 3 independent PCI buses 820 that are merged at the ASIC. The Barium ASIC performs first-in, first-out (FIFO) buffering and interconnect protocol translation on the PCI data to enable connectivity to the Cobalt ASICs and, ultimately, to the PRE of the aggregator.

Both line cards 700, 800 also include a microprocessor (µp) coupled to the Barium ASIC. The microprocessor configures its line card and monitors the "health" of the various channels on the card. Both the OC-12 and DS3 cards require OC-12 bandwidth and, thus, generally couple to the backplane through the lower subslot connector 620 (e.g., SS1) of each backplane slot. In the illustrative embodiment, however, the DS3 card also couples to the backplane through the upper subslot connector SS0 such that, e.g., ports 0–3 of the card are on SS0 and ports 4–5 are on SS1. Half-height line cards may be inserted into each subslot of a particular slot to thereby enable a total of 2 half-height cards per slot of the backplane.

In accordance with the present invention, a bound mode mechanism is provided when more than OC-12 bandwidth is needed to accommodate data traffic at the aggregation router. Bound mode enables a vertical pair of subslot connectors to be combined or "bound" into one channel to provide twice the bandwidth, e.g., OC-24 bandwidth, of a single subslot. As noted, the point-to-point links 542 operate within a timing/phase domain that comprises physical clock and data connections over the backplane 600 of the aggregator 500. The interface circuitry 590 of the interconnect system 1000, on the other hand, provides a logical connection between the PRE and a line card, and thus functions within a framing/flow control domain. There is a one-to-one relation between a link 542 and interface circuitry 590 when operating in typical "unbound" mode; however when operating in bound mode, an interface comprises two links.

FIG. 9 is a schematic block diagram of an illustrative example of a full-height line card configured to implement the bound mode technique of the present invention. Here, the full-height line card is a Gigabit Ethernet card 900 that conforms to a data rate of 1 Gbps, which is approximately equivalent to OC-18 bandwidth or 22 times the bandwidth of a DS3 port (1.000 Mbs/44.736 Mbs is approximately 22). A Gigabit Ethernet port 914 is coupled to a buffer 920 via a PHY device 910; the buffer, in turn, is coupled to the Barium ASIC via a streaming interface. As in the case of the other line cards, a microprocessor is coupled to the Barium ASIC and is adapted to perform configuration management functions for the card.

Since OC-18 bandwidth is greater than OC-12, two connectors 930a,b are needed for the Gigabit Ethernet line card 900 to establish a narrow mode connection to the Cobalt ASIC over the backplane 600. The Barium ASIC includes an extra set of interconnect pins used to drive the upper and lower connectors 930a,b on the full-height line card. Essentially, the Barium ASIC operates to multiplex an interconnect packet over both subslot connectors SS0, SS1 of a slot for transmission over the point-to-point links 542 to the Cobalt ASIC. There, the multiplexed portions are reassembled into the packet and forwarded to the PRE.

Broadly stated, an interconnect packet is multiplexed over the two subslots on a frame basis such that four (4) bytes of a frame are sent to the lower subslot SS1 and the remaining 4 bytes of a frame are forwarded to the upper subslot SS0 of a slot. These 8 bytes are then reassembled to reconstruct the frame at interface circuitry 590b on the Cobalt ASIC and forwarded to an internal packet memory (IPM) where the entire interconnect packet is reassembled prior to forwarding to the PRE. In other words, the Barium ASIC transfers 4 bytes of OC-12 bandwidth to each subslot for a total of OC-24 bandwidth over the point-to-point links to the Cobalt ASIC. The Cobalt ASIC reassembles the two OC-12 data streams to a single OC-24 stream that comports with Gigabit Ethernet requirements.

Figure 10:
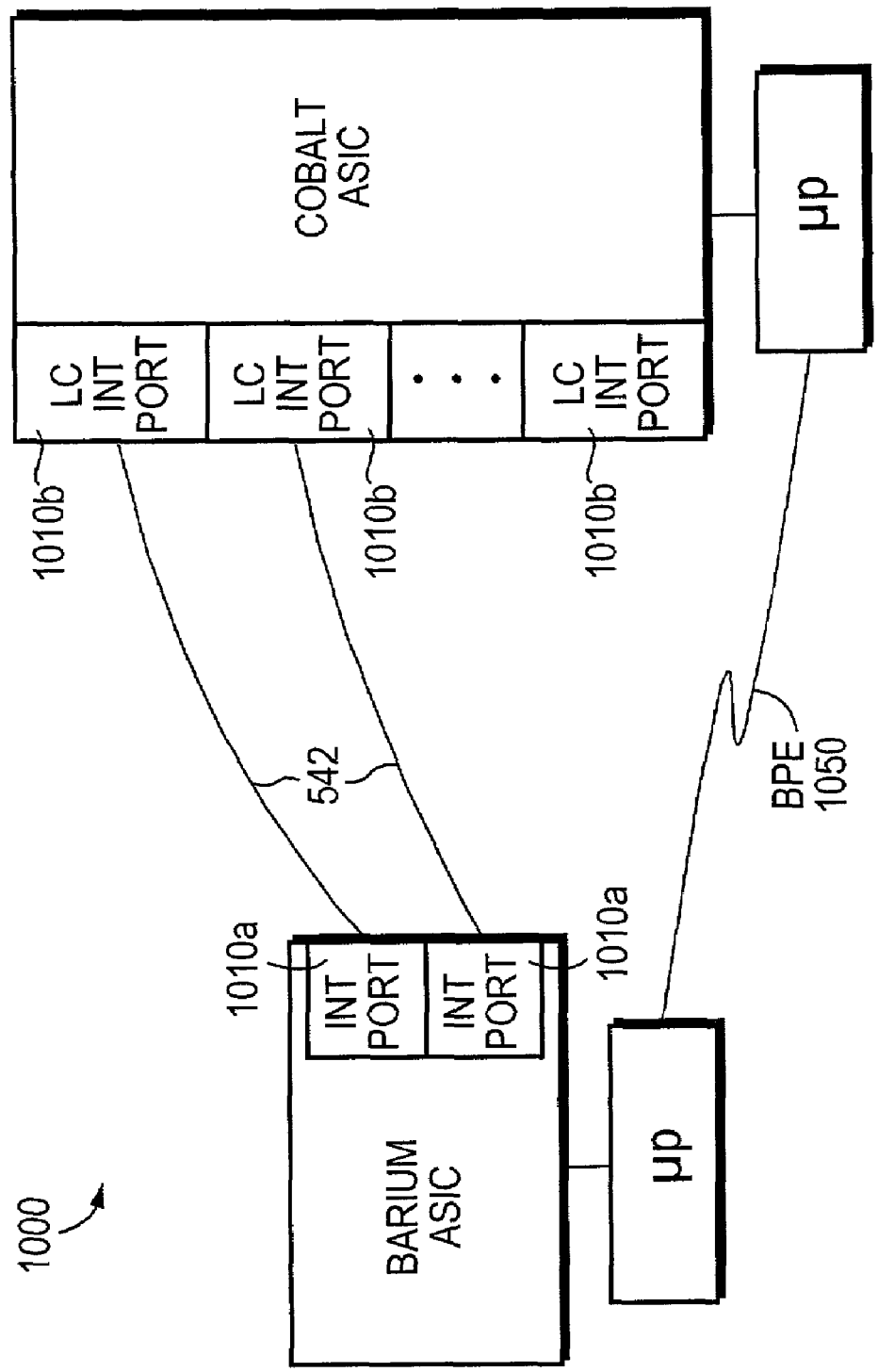
FIG. 10 is a schematic block diagram illustrating an embodiment of an interconnection system of the aggregation router.

FIG. 10 is a schematic block diagram illustrating an embodiment of the interconnection system 1000 that includes interconnect ports 1010 residing on the Barium and Cobalt ASICs of the aggregator. Each Barium interconnect port (Int Port) 1010a is coupled to one of the plurality of line card interface ports (LC Int Port) 1010b on the Cobalt ASIC via a point-to-point link 542. The microprocessor coupled to the Barium ASIC on the line card and the microprocessor coupled to the Cobalt ASIC on the PRE cooperate to configure their ASICs and the interconnect system for bound mode communication. The microprocessors preferably communicate over a backplane Ethernet (BPE) medium 1050 of the backplane. Broadly stated, when a line card is initially inserted into the backplane 600, it communicates with the PRE over the BPE 1050 in accordance with a "capabilities" exchange that identifies the type of line card and its various characteristics/parameters. One parameter exchanged between the line card and the PRE is identification of the bound mode operation.

Two links 542 of the interconnect system 1000 are required for implementing the bound mode aspect of the present invention. That is, two point-to-point links, each capable of OC-12 bandwidth transmission, are used to couple interconnect ports of the Barium ASIC to two independent line card interface ports 1010b on the Cobalt ASIC. For example, one interconnect link 542 may couple the line card to slot 3/subslot 0 of the backplane 600, whereas the other link may couple the line card to slot 3/subslot 1 of the backplane. The line card interface circuitry 590b of Cobalt is illustratively configured to combine data received at a vertical pair of a particular slot of the backplane. Thus, when operating in bound mode, the Barium ASIC receives data at a rate of OC-24 bandwidth on a line card and splits that data over two links where the data is recombined at the Cobalt ASIC to form an OC-24 data stream for delivery to the PRE. Communication between the Barium and Cobalt ASICs over the interconnect system is fully bi-directional and is effected accordingly to the interconnect protocol referred to herein.

Data is transmitted as packets, one after another, over the links as a byte stream embedded in time division multiplexing (TDM) framing. TDM framing includes information denoting the meaning of the byte stream and a method to control its flow. The interconnect protocol embeds this information in a "9th bit" column of the frame, multiplexing much of it into a framing bit. To that end, the protocol is directed to framer logic configured to "frame" and recover valid packet data within a stream of data bytes. That is, framers are provided at a transmitter of the interface logic 590a,b to generate encoded frames from a stream of packet data (bytes) for transmission over the links and at a receiver of the logic 590a,b to recover the transmitted packet data from the stream.

A frame is a minimum group of bits that is repeated within a framing pattern; it is one cycle of the pattern, carrying a single framing bit. As described further herein, the frame identifies byte boundaries and marks bytes that correspond to start-of-packet (SOP). An encoded frame preferably includes a plurality of SOP indicators (e.g., one every even byte in the packet data path) such that a maximum delay to begin transmitting a packet over a point-to-point link is generally short, e.g., sixteen (16) bits. This substantially reduces latency of packet transmission, while also reducing wasted bandwidth between packets. The frame is also the window used to find a frame synchronization pattern (i.e., frame sync pattern). The frame corresponds to a hardware clock domain transition, where bytes aligned to a slower ASIC internal clock domain are transposed to bits that are aligned to a synchronous clock domain, e.g., a 200 MHz clock domain, (or vice versa). The frame consumes a constant amount of time, independent of the number of data signals used.

FIG. 11 is a schematic block diagram illustrating the format of a 4-byte unbound frame 1100 comprising a plurality of rows 1110 with each row having 9 bits of which 8 bits (one byte) comprises packet data and 1 bit (the "9th bit") comprises control information. For each data signal, the 9th bit sampled on the falling edge of a clock signal is a SOP indicator that is asserted if a packet begins on this data signal in the current frame. In the illustrative embodiment, a value "1" indicates a SOP. In response to this indication, the first byte of a packet is recovered from the data sampled by a rising edge of a clock and the second byte is recovered by sampling the data with a falling edge of the clock. The packet continues in the next higher-numbered data signal row of the present frame or continues in the data signal 0 of the next frame. The 9th bit sampled on the rising edge of data zero is called the framing bit and is used in many ways, depending on the number of the present frame within a frame cycle.

In the illustrative embodiment, a framing bit (FB), two SOP bits and a checking bit (XNOR) are associated with each frame. The XNOR bit functions as a parity bit to detect a bad frame and to prevent the frame sync pattern from appearing by coincidence. Each 4-byte unbound frame is transmitted every 45 nsecs over a point-to-point link 542 to thereby satisfy the OC-12 bandwidth requirements. The OC-12 bandwidth preferably comprises 800 Mb of "raw" information including control information (FB, SOP and XNOR). That is, the 800 Mb of information includes 711 Mb of user data and control information. Moreover, the 711 Mb of user data is de-rated to 622 Mb of line data and 89 Mb of "speed up" data, the latter used to "drain" buffers on the line card.

According to the bound mode aspect of the present invention, an 8-byte bound frame 1150 is provided in connection with a narrow interconnect implementation of the invention. The bound frame 1150 comprises two unbound 4-byte frames 1100a,b, one for each subslot 620 of a slot. For example, the bound frame 1150 combines the 4-byte frame 1100a of SS1 with the 4-byte frame 1100b of SS0 to provide OC-24 bandwidth or 1600 Mb of total raw data. Of that 1600 Mb, 1422 Mb are allocated for user data and the remainder is allocated for control information. Specifically, of the 1422 Mb of user data, 1244 Mb are allocated for line data, thereby easily accommodating the 1000 Mb bandwidth required for Gigabit Ethernet. An example of a framing technique that may be advantageously used with the present invention is disclosed in U.S. patent application Ser. No. 09/791,062 filed on Feb. 22, 2001 now issued as U.S. Pat. No. 6,973,072 on Dec. 6, 2005 titled High Performance Protocol for an Interconnect System of an Intermediate Network Node incorporated by reference herein.

In the illustrative embodiment, bound mode operates synchronously, though there are two distinct timing domain paths crossing the backplane. These timing domains manifest as paths coupled to two subslot connectors of a full slot within the backplane. Both paths operate with their own clocks, as in an unbound case, because of the need to recover data timing with a clock signal traveling with the data. Timing of the two interconnect paths is recombined at a frame clock level. In addition, the wire lengths of the subslots may not be matched. This is tolerated by large timing margins in a receiver where, e.g., the clock of subslot 1 is used to "pick up" subslot 0.

When operating in bound mode, it is possible that the wire lengths between the two point-to-point links 542 needed to transfer data in accordance with the OC-24 data rate are different. At the physical layer, the links operate at 400 Mbps or the equivalent of 2.5 nsecs for each bit time. The links 542 coupled to subslots 620 of a particular slot may differ in length because of an unbalanced pattern between connectors on the subslots and the PRE of the backplane 600. In addition, it is difficult to control the lengths of wire traces coupled to independent connectors on the backplane. Moreover, the wire traces may be disposed at different locations and/or layers of a printed circuit board (PCB), thereby resulting in different dielectric constants that affect the speed of signals transferred over the traces. In sum, process, voltage and temperature (PVT) variations among the components of a PCB affect the speed of signals, whereas length, material and noise may affect the timing/synchronization or "skew" among signals transferred over the backplane of the aggregation router. PVT variations also skew timing of the subslot interfaces in the Barium and Cobalt ASICs.

The bound mode invention takes advantage of the fact the same die is used in both the transmitter and receiver (i.e., Barium and Cobalt ASICs) of a point-to-point link 542 for low-level timing purposes. However, it cannot be assumed that the two clock signals forwarded over the links are substantially synchronized at the receiver. The resulting clock skew includes various components such as trace skew, process or silicon skew and skew associated with skin effect. The present invention is directed, in part, to a technique for substantially reducing clock skew when operating within bound mode of the present invention.

As noted, the interconnect system 1000 utilizes a clock forwarding technique wherein a clock signal accompanies data transmitted over a point-to-point link 542 and the forwarded clock is used to receive the data at the receiver. In bound mode, two links associated with two subslots 620 of a slot are used to transport data from the transmitter to the receiver. Significantly, different clock signals are used to accompany their respective data over their respective links; however, both clock signals are generated from the same source at the transmitter. When operating in a wide mode embodiment of the invention, a single forwarded clock may be used to receive data transmitted over two additional data lines such that the clock forwarded ratio is 1 clock signal for a bundle of 4 data signals. However, wide mode operation takes place within a subslot 620; this technique is not desirable for operation across two subslots, as in the case of bound mode, because of the penalty associated with the added clock skews. Accordingly, two clock signals, each accompanying their respective data, are used independently at the receiver during bound mode operation.

Since both clock signals are generated from a single source, the frequencies of the forwarded clocks are identical and, in fact, the delay between the forwarded clocks at the receiver is (remains) substantially fixed. This fixed delay may be attributable to the different lengths between the wires of the point-to-point links 542. The delay may be on the order of 10 to 15 nsecs and, thus, results in the creation of two different clock domains associated with the different subslots 620 within the ASIC (Cobalt or Barium) that must be reconciled (brought back together) at "chip core" circuitry of the ASIC. As noted, the receiver at each point-to-point link is substantially identical; this facilitates integration of 16 line card interface circuits on one side of the Cobalt ASIC. The output of the receiver is coupled to framer logic (i.e., a "framer") configured to generate the frames previously described.

Figure 12:
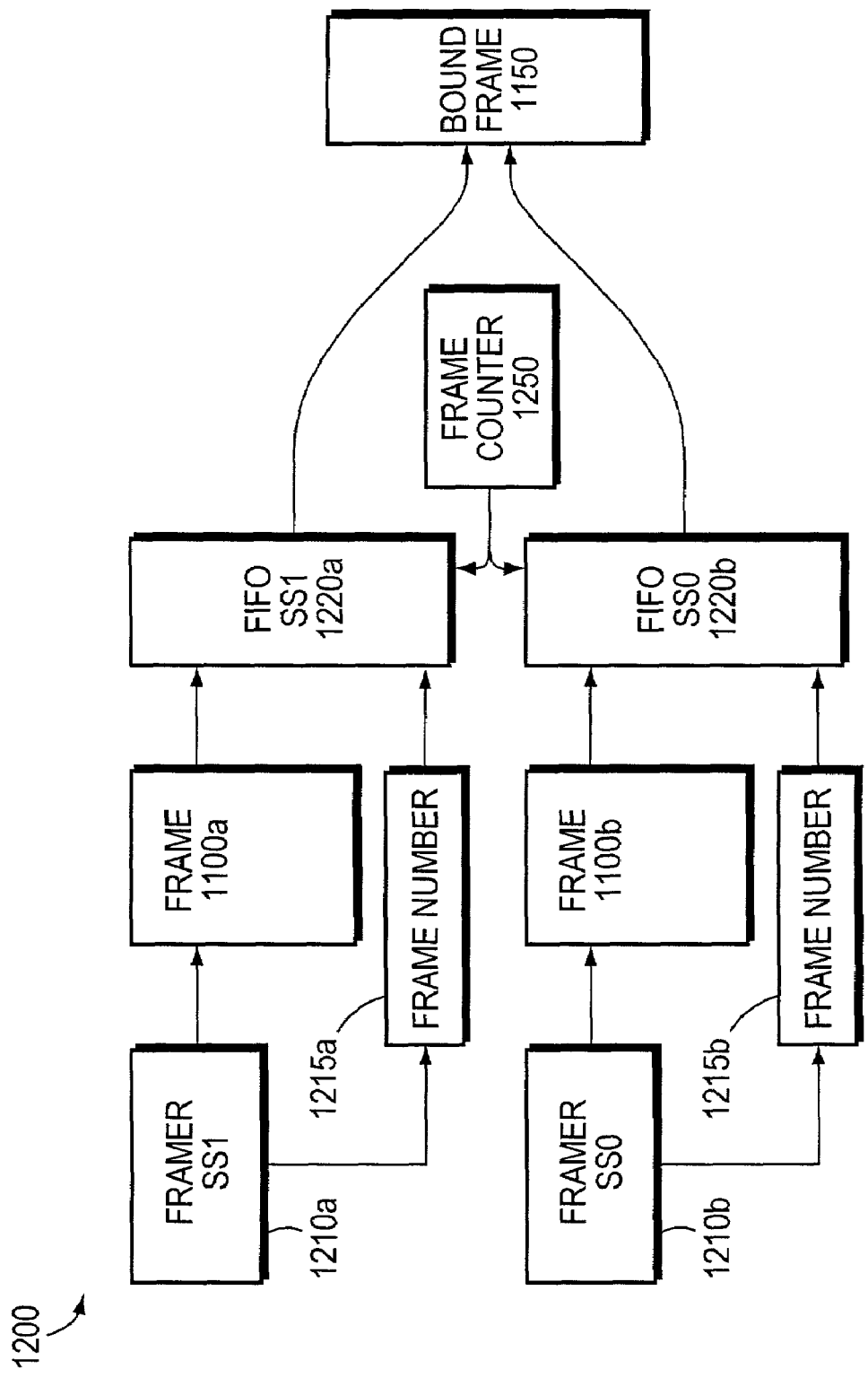
FIG. 12 is a schematic block diagram illustrating transceiver circuitry configured to implement the bound mode mechanism of the present invention.

In accordance with an aspect of the present invention, the clock domains generated as a result of the bound mode operation are reconciled at the chip core through the use of clock synchronization circuitry. FIG. 12 is a schematic block diagram illustrating an embodiment of clock synchronization circuitry 1200 configured to implement the bound mode mechanism of the present invention. The clock synchronization circuitry is illustratively shown at a receiver (e.g., of the Cobalt ASIC) and is employed to recover unbound frames generated by a framer at a transmitter (e.g., of the Barium ASIC) for transmission over the links 542. The unbound frame 1100a recovered in subslot SS1 in accordance with the SS1 clock domain is reconciled with the unbound frame 1100b recovered in accordance with the SS0 clock domain through the use of FIFO buffers 1220a,b. The FIFOs synchronize the SS0 and SS1 clock domains to the chip core clock domain of the Cobalt ASIC (and/or Barium ASIC). That is, the frame 1100a recovered by the framer 1210a at SS1 is loaded into the FIFO 1220a at SS1 using the forwarded clock provided at SS1. Similarly, the frame 1100b recovered by the framer 1210b at SS0 is loaded into the FIFO 1220b at SS0 using the received forwarded clock and clock domain associated with SS0.

The various clock domains are generally reconciled at a well-defined boundary at the core of the ASIC (Barium or Cobalt) to ensure reliable data transfers across the boundary. A frame number 1215 associated with each frame is also loaded into the FIFO 1220. The definition of the framing bit (FB) depends on the number of the frame from which it is extracted. The frame number 1215 (or a portion thereof) may be used as an address to identify an entry of the FIFO 1220 used to store a frame 1100.

Because each FIFO is associated with a subslot clock domain, there may be more frames written into one of the FIFOs than the other during a particular time, especially if one of the clock paths is shorter. Accordingly, the chip core samples the FIFOs when the frames are located at the same entry (frame number) and when the frame data is valid. To that extent, the chip core utilizes a frame counter 1250 that, in one embodiment, may be associated with each FIFO, particularly for the unbound mode case. In bound mode, however, only one frame counter 1250 is preferably used to retrieve frames from both FIFOs. That way, a frame number 1215 may be used to retrieve frame data from both FIFOs 1220a,b and allows them to be easily combined into one 8-byte bound frame 1150. Thus, the chip core brings the frames back into alignment within its clock domain by waiting until the data is loaded (and valid) within the FIFOs, and thereafter retrieving them simultaneously using the same address (frame number 1215).

Specifically, each FIFO has a write pointer referencing a particular address (entry) to which a frame is being written and a read pointer referencing an address to which a frame is being retrieved. The difference between the read and write pointer denotes a depth of a FIFO. At the chip core, logic (not shown) is provided that drives the frame counter 1250. The frame counter 1250 monitors the depth of the FIFO and upon becoming, e.g., half full, starts at value 0 and begins to retrieve frames from entries of the FIFOs corresponding to frame number 0. Upon retrieving frame number 0 from each FIFO, the chip core treats both frames as one logical 8-byte frame 1150 and forwards that frame to the internal logic of the ASIC where they are assembled into an interconnect packet at the IPM. Thus, the chip core reconstructs the 8-byte bound frame 1150 from the two subslot clock domains and treats that bound frame as a single data flow to the IPM.

The frames are retrieved from the FIFOs at the boundary of the line card interface circuitry on a time basis, e.g., one frame from each FIFO every 45 nsecs, and reassembled into a bound frame for transmission to the IPM. A bound frame 1150 is interpreted in a manner similar to an unbound frame 1100 with one extension: subslot 1 is the leader. That is, the subslot 1 link is the actual source of clock and framing, and therefore supplies all of the flow control information. A framing bit of the subslot 0 link is asserted during the frame sync interval, just as if it were unbound, but is otherwise ignored. Packet data starts in subslot 1, then continues to subslot 0. Each link carries its own SOP bits and calculates a XNOR (and any parity bits) to match. This pattern of data bytes and SOP flags is the same as would appear for a single point-to-point link with twice the number of data signals.

While there has been shown and described an illustrative embodiment for allowing a full-slot line card to utilize two half-slot line card connectors of a backplane in an aggregation router, it is to be understood that various other adaptations and modifications may be made within the spirit and scope of the invention. For example, in an alternate embodiment of the invention, the bound mode technique may be extended to support OC-48 bandwidth using wide mode. In this case, the Gigabit Ethernet line card may be configured as a half-height card capable of providing approximately OC-24 data rates. Thus, two Gigabit Ethernet line cards can be inserted into the subslots of a backplane slot or two wide subslots may be used in bound, wide mode for an OC-48 line card, or other line card of similar bandwidth.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently accommodating high-bandwidth data flow within an intermediate node of a computer network, the method comprising the steps of:

providing a backplane of the intermediate node, the backplane having at least one central slot and a plurality of adjacent slots, each adjacent slot comprising two subslots;

configuring each subslot with a connector adapted to accommodate one of a half-height and full-height line card of the intermediate node; and binding two subslot connectors of the backplane to accommodate a full-height line card and to increase the bandwidth provided to the full-height line card.

2. The method of claim 1 wherein the step of binding comprises the step of combining a vertical pair of upper and lower subslot connectors of a slot into a single channel to provide twice the bandwidth of a single subslot connector.

3. A method for efficiently accommodating high-bandwidth data flow within an intermediate node of a computer network, the method comprising the steps of:

providing a backplane of the intermediate node, the backplane having at least one central slot and a plurality of adjacent slots, each adjacent slot comprising two subslots;

configuring each subslot with a connector adapted to accommodate one of a half-height and full-height line card of the intermediate node;

combining a vertical pair of upper and lower subslot connectors of a slot into a single channel to provide twice the bandwidth of a single subslot connector, to increase the bandwidth provided to the full-height line card;

multiplexing data at the full-height line card over the subslot connectors;

transmitting the multiplexed data over an interconnect system to a backplane logic circuit of the intermediate node; and reassembling the multiplexed data at the backplane logic circuit.

4. The method of claim 3 wherein the step of multiplexing comprises the step of multiplexing a bound frame over the subslot connectors on a frame basis such that a predetermined number of data bytes are provided to the lower subslot and a remaining predetermined number of data bytes are provided to the upper subslot of the slot.

5. The method of claim 4 wherein the predetermined number of bytes comprises an unbound frame and wherein the step of transmitting comprises the step of sending an unbound frame over each of the vertical pair of subslot connectors.

6. The method of claim 5 wherein the step of reassembling comprises the step of reconstructing the bound frame at the backplane logic circuit.

7. The method of claim 6 wherein the full-height line card is a high-speed trunk card of the intermediate node.

8. The method of claim 6 wherein the intermediate node is a router.

9. The method of claim 3 wherein the interconnect system comprises point-to-point links.

10. The method of claim 1 wherein the step of providing comprises the step of organizing and arranging the adjacent slots on each side of the central slot.

11. Apparatus for efficiently accommodating high-bandwidth data flow within a router of a computer network, the apparatus comprising:
a backplane of the router, the backplane having at least one central slot and a plurality of adjacent slots, each adjacent slot comprising two subslots;
a connector configured with each subslot, the connector adapted to accommodate one of a half-height and full-height line card of the router; and
a bound mode mechanism adapted to combine two subslot connectors of an adjacent slot into a single channel to accommodate a full-height line card and to provide twice the bandwidth of a single subslot connector to the full-height line card.

12. Apparatus for efficiently accommodating high-bandwidth data flow within a router of a computer network, the apparatus comprising:
a backplane of the router, the backplane having at least one central slot and a plurality of adjacent slots, each adjacent slot comprising two subslots;
a connector configured with each subslot, the connector adapted to accommodate one of a half-height and full-height line card of the router; and
a bound mode mechanism adapted to combine two subslot connectors of an adjacent slot into a single channel to accommodate a full-height line card and to provide twice the bandwidth of a single subslot connector to the full-height line card;
a framer associated with each subslot and configured to recover an unbound frame transmitted over the channel;
a buffer associated with each subslot and configured to store the recovered unbound frame addressed by a frame number; and
a frame counter configured to retrieve the unbound frames from both buffers using the frame number to thereby enable assembly of the unbound frames into a bound frame.

13. The apparatus of claim 11 wherein the backplane includes two central full slots, each having a connector configured to accommodate a performance routing engine (PRE) module assembly.

14. The apparatus of claim 13 wherein the central slot connectors are used to accommodate redundant PRE assemblies.

15. The apparatus of claim 11 wherein the connector of each subslot is a generic subslot connector capable of supporting a variety of data formats.

16. The apparatus of claim 15 wherein the data formats include DS3, SDH1, OC-3, ATM or DSL formats.

17. The apparatus of claim 11 wherein the full-height line card is one of an OC-12 trunk/subscriber line card and a DS3 line card used in accordance with a narrow, unbound mode connection.

18. The apparatus of claim 11 wherein the full-height line card is a Gigabit Ethernet card capable of providing approximately OC-18 bandwidth in accordance with a narrow mode connection.

19. The apparatus of claim 11 wherein the half-height line card is a Gigabit Ethernet line card capable of providing approximately OC-24 data rates in accordance with a wide mode connection.

20. The apparatus of claim 11 wherein the full-height line card is a Gigabit Ethernet line card used in accordance with the bound mode mechanism.

21. Apparatus adapted to increase bandwidth provided to a full-slot line card of a router, the apparatus comprising the steps of:
a backplane of the router, the backplane having at least one central slot and a plurality of adjacent slots, each adjacent slot comprising a vertical pair of subslots;
a connector configured with each subslot;
means for combining the vertical pair of subslot connectors into a single channel to provide twice the bandwidth of a single subslot connector;
means for multiplexing data over the vertical pair of subslot connectors;
means for transmitting the multiplexed data over an interconnect system to a backplane logic circuit of the router; and
means for reassembling the multiplexed data at the backplane logic circuit.

22. A method for providing high bandwidth transfer in an intermediate node of a computer network, comprising:
providing a backplane of the intermediate node, the backplane having a plurality of adjacent slots, each adjacent slot having two subslots;
configuring each subslot with a connector adapted to accommodate a line card of the intermediate node;
combining a pair of subslot connectors of a slot into a single channel to provide greater bandwidth than a single subslot connector;
multiplexing data over the subslot connectors;
transmitting the multiplexed data over an interconnect system to a backplane logic circuit of the intermediate node; and
reassembling the multiplexed data at the backplane logic circuit.

23. The method of claim 22 further comprising:
multiplexing a frame over the subslot connectors such that a predetermined number of data bytes are provided to a first subslot of the subslot connectors and a remaining predetermined number of data bytes are provided to a second subslot of the subslot connectors.

24. The method of claim 22 further comprising:
transmitting a different frame over each of the subslot connectors.

25. The method of claim 22 further comprising:
reconstructing a single frame multiplexed over the pair of connectors at the backplane logic circuit.

26. The method of claim 22 further comprising:
connecting a high-speed trunk card of the intermediate node into the pair of subslots.

27. The method of claim 22 further comprising:
using a router as the intermediate node.

28. The method of claim 22 further comprising:
using point-to-point links as the interconnect system.

29. The method of claim 22 further comprising:
organizing and arranging the adjacent slots on each side of a central slot.

30. An apparatus to provide high bandwidth transfer in an intermediate node of a computer network, comprising:
means for providing a backplane of the intermediate node, the backplane having a plurality of adjacent slots, each adjacent slot having two subslots;
means for configuring each subslot with a connector adapted to accommodate a line card of the intermediate node;
means for combining a pair of subslot connectors of a slot into a single channel to provide greater bandwidth than a single subslot connector;
means for multiplexing data over the subslot connectors;
means for transmitting the multiplexed data over an interconnect system to a backplane logic circuit of the intermediate node; and
means for reassembling the multiplexed data at the backplane logic circuit.

31. The apparatus of claim 30 further comprising:
means for multiplexing a frame over the subslot connectors such that a predetermined number of data bytes are provided to a first subslot of the subslot connectors and a remaining predetermined number of data bytes are provided to a second subslot of the subslot connectors.

32. The apparatus of claim 30 further comprising:
means for transmitting a different frame over each of the subslot connectors.

33. The apparatus of claim 30 further comprising:
means for reconstructing a single frame multiplexed over the pair of connectors at the backplane logic circuit.

34. The apparatus of claim 30 further comprising:
means for connecting a high-speed trunk card of the intermediate node into the pair of subslots.

35. The apparatus of claim 30 further comprising:
means for using a router as the intermediate node.

36. The apparatus of claim 30 further comprising:
means for using point-to-point links as the interconnect system.

37. The apparatus of claim 30 further comprising:
means for organizing and arranging the adjacent slots on each side of a central slot.

38. Apparatus for accommodating high-bandwidth data flow within a router of a computer network, comprising:
a backplane of the router, the backplane having a plurality of adjacent slots, each adjacent slot having two subslots;
a connector configured with each subslot, each connector adapted to accommodate a line card of the intermediate node;
a backplane logic circuit configured to receive data multiplexed over the two subslots and to reconstruct a single frame from the multiplexed data.

39. The apparatus as in claim 38, further comprising:
an interconnect system to connect the two inline connectors with the backplane logic circuit.

40. The apparatus as in claim 38, further comprising:
the pair of inline subslot connectors of a slot formed into a single channel to provide greater bandwidth than a single subslot connector.

41. The apparatus as in claim 38, further comprising:
a framer associated with each subslot and configured to recover an single frame transmitted over the channel;
a buffer associated with each subslot and configured to store the recovered single frame addressed by a frame number; and
a frame counter configured to retrieve the single frames from both buffers using the frame number to thereby enable assembly of the single frames into a combined frame.

42. The apparatus as in claim 38, further comprising:
the backplane includes two central full slots, each having a connector configured to accommodate a performance routing engine (PRE) module assembly.

43. The apparatus as in claim 38, further comprising:
a central slot connector accommodates redundant PRE assemblies.

44. The apparatus as in claim 38, further comprising:
the connector of each subslot is a generic subslot connector capable of supporting a variety of data formats.

45. The apparatus as in claim 44, further comprising:
the data formats include DS3, SDH1, OC-3, ATM or DSL formats.

46. The apparatus as in claim 38, further comprising:
an OC-12 trunk/subscriber line card using both subslots of the pair of subslots.

47. The apparatus as in claim 38, further comprising:
a DS3 line card.

48. The apparatus as in claim 38, further comprising:
a Gigabit Ethernet card capable of providing approximately OC-18 bandwidth.

49. The apparatus as in claim 38, further comprising:
a Gigabit Ethernet line card capable of providing approximately OC-24 data rates.

50. The apparatus as in claim 38, further comprising:
a Gigabit Ethernet line card used in accordance with a bound mode mechanism.

* * * * *